(12) United States Patent
Hara

(10) Patent No.: US 7,586,632 B2
(45) Date of Patent: Sep. 8, 2009

(54) METHOD OF AND SYSTEM FOR RECEIVING ORDERS FOR PRINTS, AND COMPUTER PROGRAM FOR USE IN THE METHOD AND SYSTEM

(75) Inventor: Makoto Hara, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 1189 days.

(21) Appl. No.: 10/190,626

(22) Filed: Jul. 9, 2002

(65) Prior Publication Data

US 2003/0011817 A1      Jan. 16, 2003

(30) Foreign Application Priority Data

Jul. 10, 2001  (JP) .................. 2001-209497

(51) Int. Cl.
*G06F 15/00* (2006.01)
*G06F 3/12* (2006.01)
*G06K 1/00* (2006.01)

(52) U.S. Cl. ................. 358/1.15; 358/1.13

(58) Field of Classification Search ......... 358/1.1–1.18; 710/17, 18, 19, 31, 33, 34, 46; 709/202, 709/203
See application file for complete search history.

(56) References Cited

U.S. PATENT DOCUMENTS

| | | | |
|---|---|---|---|
| 6,980,964 B1 * | 12/2005 | Cocotis et al. | ............... 705/26 |
| 7,057,648 B2 * | 6/2006 | Parulski et al. | ............ 348/231.2 |
| 2001/0041985 A1 | 11/2001 | Shiota et al. | |
| 2003/0110304 A1 * | 6/2003 | Iwaishi et al. | |

FOREIGN PATENT DOCUMENTS

| | | |
|---|---|---|
| JP | 10-214295 | 8/1998 |
| JP | 11-31184 | 2/1999 |

* cited by examiner

*Primary Examiner*—Douglas Q Tran
(74) *Attorney, Agent, or Firm*—Sughrue Mion, PLLC

(57) ABSTRACT

Orders for prints of image data are received at an order receipt server connected to a user terminal by way of a network. A plurality of entry web pages each corresponding to one of a plurality of brands are prepared in the order receipt server, and the order receipt server is caused to receive orders for prints under the brand corresponding to the entry web page to which the user terminal is connected.

12 Claims, 7 Drawing Sheets

| BRAND INFORMATION DATA BASE |||
|---|---|---|
| ID | BRAND | LOGO FILE |
| 1<br>2<br>NO | XX CAMERA<br>CAMERA YY<br>FF FILM | xx.gif<br>yy.gif<br>FF.gif |

FIG.4

| PRICE DATA BASE | | |
|---|---|---|
| ID | L SIZE | 2l SIZE |
| 1 | 35 | 100 |
| 2 | 40 | 90 |
| NO | 40 | 100 |

| ID | TEMPLATE |
| --- | --- |
| TEMPLATE DATA BASE | |
| 1<br>2<br>NO | aa.jpg<br>bb.jpg<br>FF.jpg |

| ID | SHOP |
|---|---|
| | SHOP DATA BASE |
| 1 | XX CAMERA AA SHOP |
| 1 | XX CAMERA BB SHOP |
| 2 | CAMERA YY CC SHOP |
| 2 | CAMERA YY DD SHOP |

D4

METHOD OF AND SYSTEM FOR RECEIVING ORDERS FOR PRINTS, AND COMPUTER PROGRAM FOR USE IN THE METHOD AND SYSTEM

BACKGROUND OF THE INVENTION

1. Field of the Invention

This invention relates to a method of and a system for receiving orders for prints of image data by way of a network and to a program for causing a computer to execute processing of receiving orders for prints of image data by way of a network.

2. Description of the Related Art

There have been known various digital photo-service systems for providing various services on digital pictures such as digitizing pictures taken by users and storing digital image data representing the pictures in an image server, recording digital image data representing the pictures taken by users on a CD-Rand providing the CD-R to the users, printing pictures taken by digital cameras, and receiving orders for extra copies. As one form of such digital photo-service systems, there has been proposed a network photo-service system for receiving, for instance, orders for prints by way of a network such as the Internet.

In such a network photo-service system, users install in their personal computers (user terminals) viewer software for reproducing image data recorded in a CD-R or image data which the users obtain by the use of their digital camera and reproduce images on the basis of the image data, and creates order information representing the contents of order by the use of an order function installed in the viewer software. Then the users send the order information to the order receipt server from their user terminal by way of a network together with image data representing the images to be printed.

The order receipt server transfers the image data and the order information to a print server in a photo-processing shop (e.g., a large-scale laboratory or a mini laboratory). In the print server, for instance, extra copies are printed, post cards with a picture are printed or an album is made on the basis of the order information.

Prints thus obtained is sent to a shop which the user designates in advance upon sending the order information and the user visits the shop to receive the prints and pay the shop.

The "order information" includes, for instance, a process number for designating the content of service such as printing extra copies or making postcards, a picture number for designating the picture on which the service is to be done, the size of the prints, the number of copies, the quality of the print surface (glossy or matte), the thickness of the print, the contents of processing, an information on trimming. The "order information" may sometimes include the name, address, zip code, telephone number and the like of the user making the order.

Recently there have appeared mail-order firms which run a mail-order business on a web site of the Internet. Some of such mail-order firms want to provide a network photo-service such as described above. Further, some photo-processing shops also want to provide such a network photo-service.

However since construction of such a network photo-service system is very costly, it is very inefficient for the mail-order firms or the photo-processing shops to individually construct such a network photo-service system. Accordingly, for the mail-order firms or the photo-processing shops, it is desirable to associate with an existent photo-processing firm already running a network photo-service system and to have business executed by the existent firm. This is also desirable for the existent photo-processing firm already running a network photo-service system in that it provides an additional chance of business.

However when the network photo-service system run by the existent photo-processing firm is used as it is, there arises a problem that the name of the existent photo-processing firm is displayed on the screen or the price is set as set by the existent photo-processing firm when an order of prints is to be made, which is trouble for the mail-order firms or the photo-processing shops who want to provide a network photo-service system with its own brand and can result in loss of additional chance of business for the existent photo-processing firm already running a network photo-service system.

SUMMARY OF THE INVENTION

In view of the foregoing observations and description, the primary object of the present invention is to provide a method of and a system which can receive orders for prints of image data by way of a network under different brands under which the contents of service are different.

Another object of the present invention is to provide a program for causing an order receipt server to execute processing of receiving orders for prints of image data by way of a network under different brands.

In accordance with a first aspect of the present invention, there is provided a method of receiving orders for prints of image data at an order receipt server connected to a user terminal by way of a network comprising the steps of preparing in the order receipt server a plurality of entry web pages each corresponding to one of a plurality of brands, and causing the order receipt server to receive orders for prints under the brand corresponding to the entry web page to which the user terminal is connected.

The "order receipt server" may comprise, for instance, a server computer which is installed in, for instance, a print order receipt center for exclusively receiving orders for prints and is connected directly to a printer in the print receipt center or to a printer server in a photo-processing shop such as a large-scale laboratory or a mini laboratory by way of a network. In the latter case, the order receipt server sends the image data together with information on the print delivery shop at which the user receives the products to the printer server and the printer server prints the image data.

In accordance with a second aspect of the present invention, there is provided a system for receiving orders for prints of image data at an order receipt server connected to a user terminal by way of a network, wherein the improvement comprises that the order receipt server is provided with a plurality of entry web pages each corresponding to one of a plurality of brands so that the order receipt server receives orders for prints under a brand selected from the plurality of brands by the user.

At least one of the entry web pages may correspond to a brand of a web site provided by another web server connected to the order receipt server by way of a network.

Further, each of the entry web pages may be provided with a brand ID and the order receipt server may be provided with a data base which stores the brand ID together with print service information corresponding to the brand ID. The "print service information" may be at least one of image data for displaying logos of the brands, template data which is combined with image data to make postcards and information on the print delivery shop at which the user receives the products.

The "data base" may be in any form so long as it can be read out through the order receipt server. For example, the data base may be stored in a storage medium built in a sever computer employed as the order receipt server or in a data base server connected to the order receipt server.

The order receipt server may receive orders in paging systems which are different by entry web pages.

In accordance with a third aspect of the present invention, there is provided a program for causing an order receipt server connected to a user terminal by way of a network to execute processing of receiving orders for prints of image data from the user terminal, the program comprising processing of displaying an entry web page designated by the user out of a plurality of entry web pages each corresponding to one of a plurality of brands, and receiving orders for prints under the brand corresponding to the entry web page to which the user terminal is connected.

A computer program for causing a computer to perform the method of the present invention may be recorded in a computer readable medium so that the computer can perform the method when loaded with the recording medium. A skilled artisan would know that the computer readable medium is not limited to any specific type of storage devices and includes any kind of device, including but not limited to CDs, floppy disks, RAMs, ROMs, hard disks, magnetic tapes and internet downloads, in which computer instructions can be stored and/or transmitted. Transmission of the computer code through a network or through wireless transmission means is also within the scope of this invention. Additionally, computer code/instructions include, but are not limited to, source, object and executable code and can be in any language including higher level languages, assembly language and machine language.

In accordance with the present invention, since orders for prints are received on web pages which are different by brands, the orders can be received under different brands under which the contents of service are different.

BRIEF DESCRIPTION OF THE DRAWINGS

FIG. 4 is a view showing the data base in which brand Ids and information on the prices of prints corresponding to each of the brand Ids are stored, FIG. 5 is a view showing the data base in which brand Ids and the names of the files of image data representing the postcard templates corresponding to each of the brand Ids are stored, FIG. 6 is a view showing the data base in which brand Ids and the information on the print delivery shop corresponding to each of the brand Ids are stored.

DESCRIPTION OF THE PREFERRED EMBODIMENTS

Figure 1:
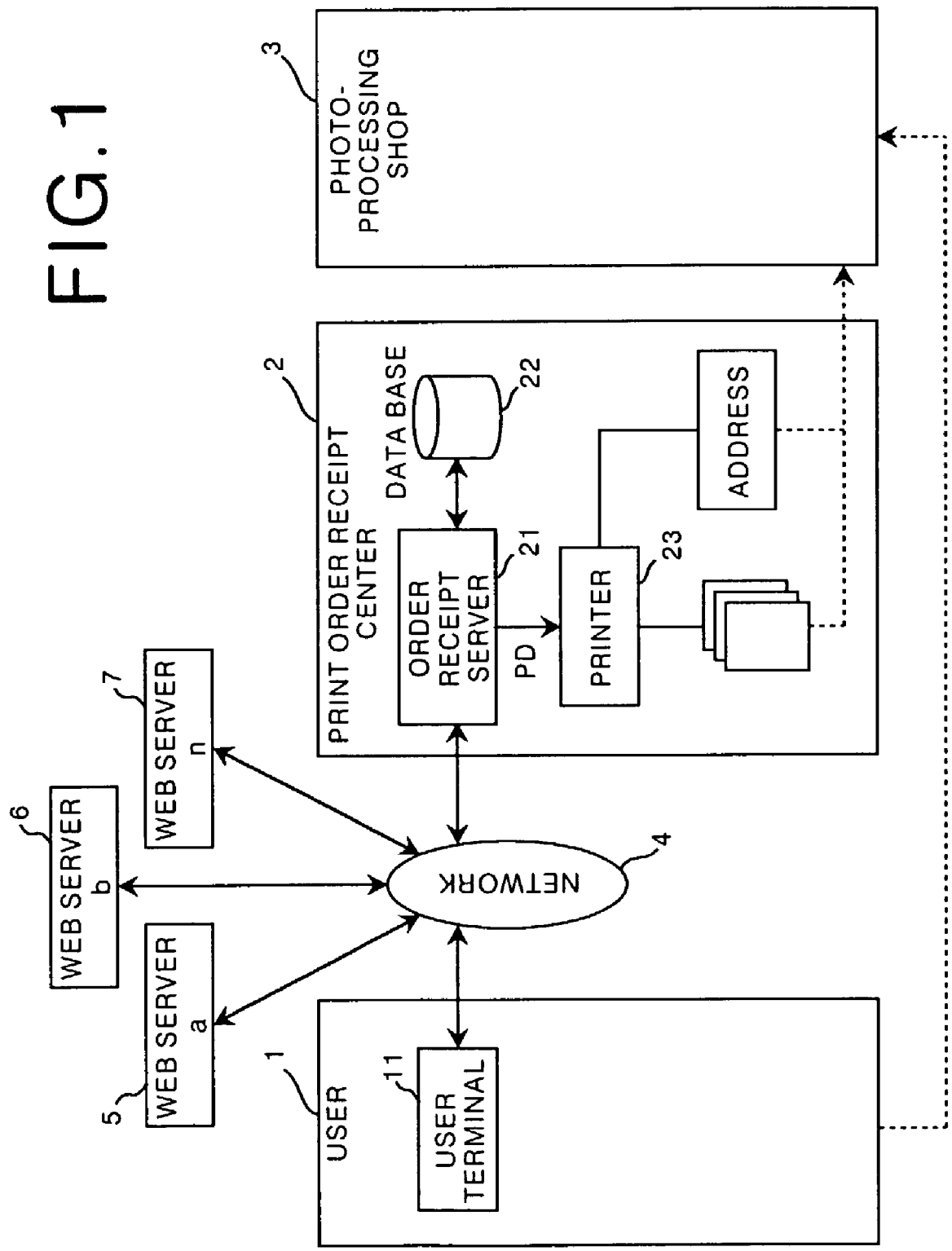
FIG. 1 is a block diagram showing a network photo-service system employing a system for receiving orders for prints in accordance with a first embodiment of the present invention.

FIG. 1 shows a network photo-service system employing a system for receiving orders for prints in accordance with a first embodiment of the present invention. The network photo-service system shown in FIG. 1 is for transferring image data, prints and the like between users 1, a print order receipt center 2 and photo-processing shops 3 by way of a network 4.

Each of the users 1 has a user terminal 11 such as a personal computer and is able to make an order for prints to the print order receipt center 2 by way of the network 4. When the user 1 has no personal computer, the user 1 can use an order terminal installed at a service center or the like as the user terminal 11.

The print order receipt center 2 is provided with an order receipt server 21 for receiving orders for prints, a data base 22 storing therein print service information by brands, and a printer 23 which obtains prints P on the basis of image data S sent from the user terminal 11 by way of the network 4 upon of the order for prints. Further, the printer 23 prints out the address of the print delivery shop on the basis of information K on the address of the print delivery shop and obtains a delivery sheet KP bearing thereon the address of the print delivery shop. The delivery sheet KP is attached to a container (e.g., a bag) containing therein prints P at the order receipt center 2 and the prints P are shipped to a print delivery shop (photo-processing shop in this particular embodiment) on the basis of the address recorded on the delivery sheet.

The print receipt server 21 has exclusive entry web pages exclusively for web site firms and photo-processing shops which have been associated in advance with the print-service firm running the print order receipt center 2 and general entry web pages for users who directly access the order receipt server 21.

A plurality of web servers such as web server a 5, web server b 6 . . . are connected to the network 4 in addition to the user terminals 11 and the order receipt server 21.

In this particular embodiment, the web server a 5 and the web server b 6 are run by firms which have been associated in advance with the print-service firm running the print order receipt center 2.

The web site a stored in the web server a 5 is linked to an entry web page of the order receipt server 21 exclusively for the web site a. Similarly, the web site b stored in the web server b 6 is linked to an entry web page of the order receipt server 21 exclusively for the web site b.

When ordering for prints, the user terminal accesses the order receipt server 21 of the print order receipt center 2 by an web browser installed in advance in the user terminal 11 and a web screen for order is displayed on the user terminal 11 on the basis of a HTML file, Java® Script stored in the order receipt server 21.

Figure 2:
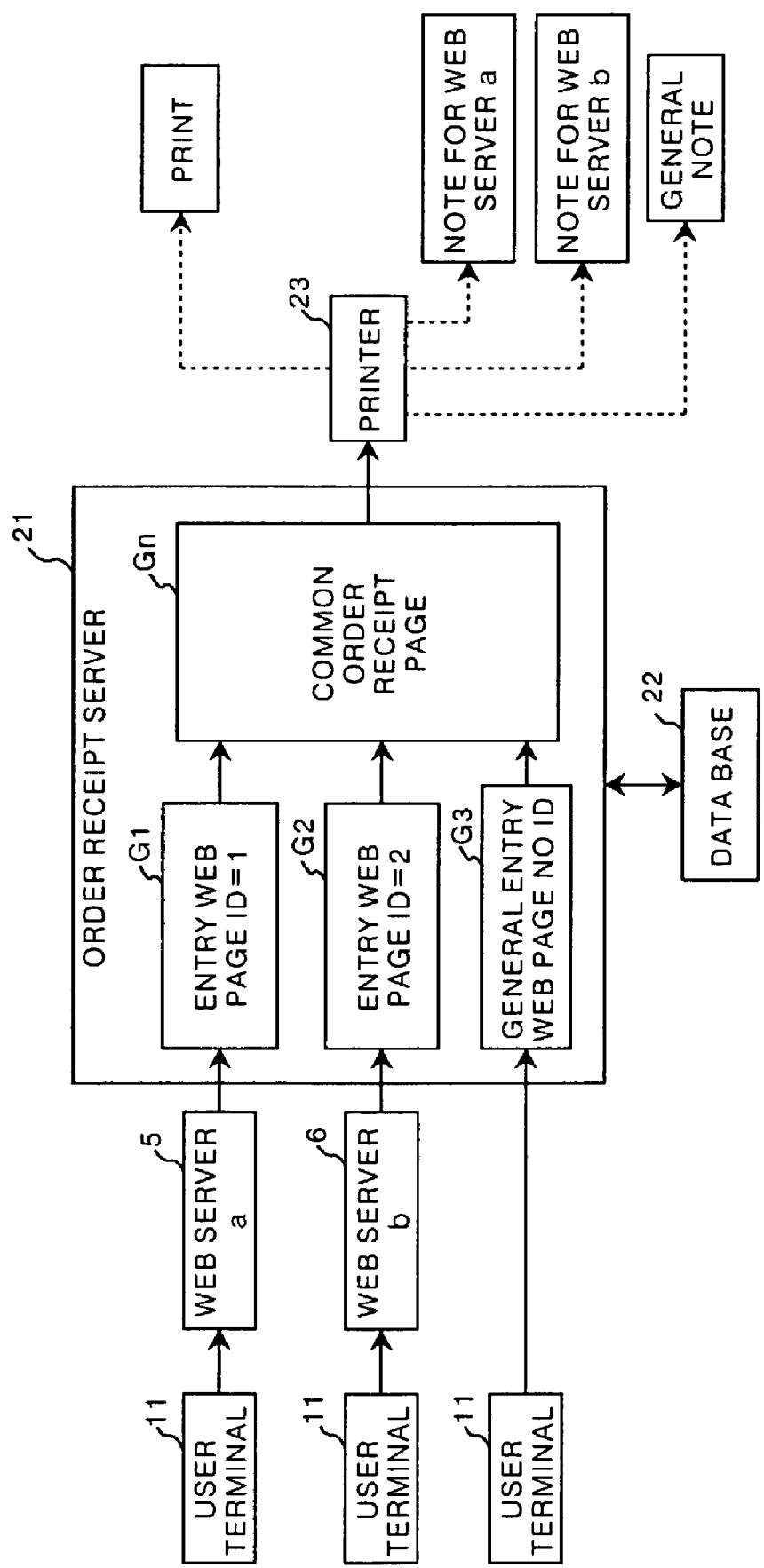
FIG. 2 is a view showing a processing flow with transition of connection of the nodes in the first embodiment.

Operation of the first embodiment will be described, hereinbelow. FIG. 2 shows a processing flow with transition of connection of the nodes in the first embodiment. In this embodiment, it is assumed that the user terminal 11 accesses the web server a and accesses to the order receipt server 21 by way of the link of the web site a.

The user 1 clicks a button for order of prints on the web page. The button is linked with the address of the entry web page G1 for the web site a in the order receipt server 21, and when the button is clicked, the user terminal 11 is connected to the order receipt server 21 of the print order receipt center 2 by an web browser installed in advance in the user terminal 11 and the entry web page G1 for the web site a is displayed on the user terminal 11.

When the user 1 accesses other web site in association with the print-service firm, the entry web page for the web site is displayed on the user terminal 11. That is, for example, the web site b is linked with the address of the entry web page G2 for the web site b in the order receipt server 21, and when the user 11 accesses to the order receipt server 21 by way of the link of the web site b, the entry web page G2 for the web site b is displayed on the user terminal 11. The print-service firm lays open to the public the address of the general entry web page G3 for providing surface under its own brand. When the user 1 wants to make an order under the brand of the print-service firm, the user 1 accesses the general entry web page G3.

When the user 1 accesses the order receipt server 21 at the entry web page for the wed site a, the order receipt server 21 causes the user terminal 11 to display the entry web page G1 for the web site a. At this time, the order receipt server 21 obtains the brand ID (=1) attached to the entry web page G1 for the web site a and obtains from the data base 22 print service information corresponding to the brand ID (=1).

Figure 3:
FIG. 3 is a view showing the data base in which brand Ids and the name of the file of image data representing the brand logo corresponding to each of the brand Ids are stored.

The "print service information" stored in the data base 22 will be described, hereinbelow. FIG. 3 shows a data base D1 in which brand Ids and the name of the file of image data representing the brand logo corresponding to each of the brand Ids are stored, FIG. 4 shows a data base D2 in which brand Ids and information on the prices of prints corresponding to each of the brand Ids are stored, FIG. 5 shows a data base D3 in which brand Ids and the names of the files of image data representing the postcard templates corresponding to each of the brand Ids are stored, and FIG. 6 shows a data base D4 in which brand Ids and the information on the print delivery shop corresponding to each of the brand Ids are stored.

The order receipt server 21 receives orders for prints on an order receipt web page which is common to all the brands after the entry web page. On the order receipt web page Gn, the brand logo corresponding to the brand ID of 1 is displayed. On the order receipt web page Gn, the user terminal 11 is caused to upload image data S to be printed. It is possible to make a postcard in which image data S is combined with one of templates as desired. At this time, said one template is selected from a plurality of displayed names of files of image data representing the postcard templates corresponding to brand Id of 1 and obtained from the data base D3. Of course, it is possible to receive an order for prints obtained by printing the image data S unprocessed. Further, prices of the prints corresponding the brand ID of 1 are obtained from the data base D2 are displayed. Then the order receipt server 21 allows the user 1 to input image data S to be printed and the number of copies desired. Further, the order receipt server 21 causes the user terminal 1 to display the list of print delivery shops and allows the user 1 to select one or more print delivery shops from the list of print delivery shops.

Upon receipt of order information, the order receipt server 21 of the print order receipt center 2 makes prints P on the basis of image data S and prints a note under brand corresponding to the brand ID of 1. The notes are contained in a bag together with the prints P. A delivery sheet KP bearing thereon the address K of the print delivery shop is bonded to the bag and the bag is shipped to the print delivery shop. The print delivery shop 3 receives the prints P in the bag and the user visits the print delivery shop 3, receives the prints P and pays the shop.

As can be understood from the description above, since the order receipt server 21 is provided with a plurality of entry web pages each corresponding to one of a plurality of brands, and orders for prints are received on a web page selected by the user, the orders can be received under different brands under which the contents of service are different.

A second embodiment of the present invention will be described, hereinbelow. The network photo-service system of this embodiment differs from that of the first embodiment in that a discrete order receipt web page is prepared for each brand.

Figure 7:
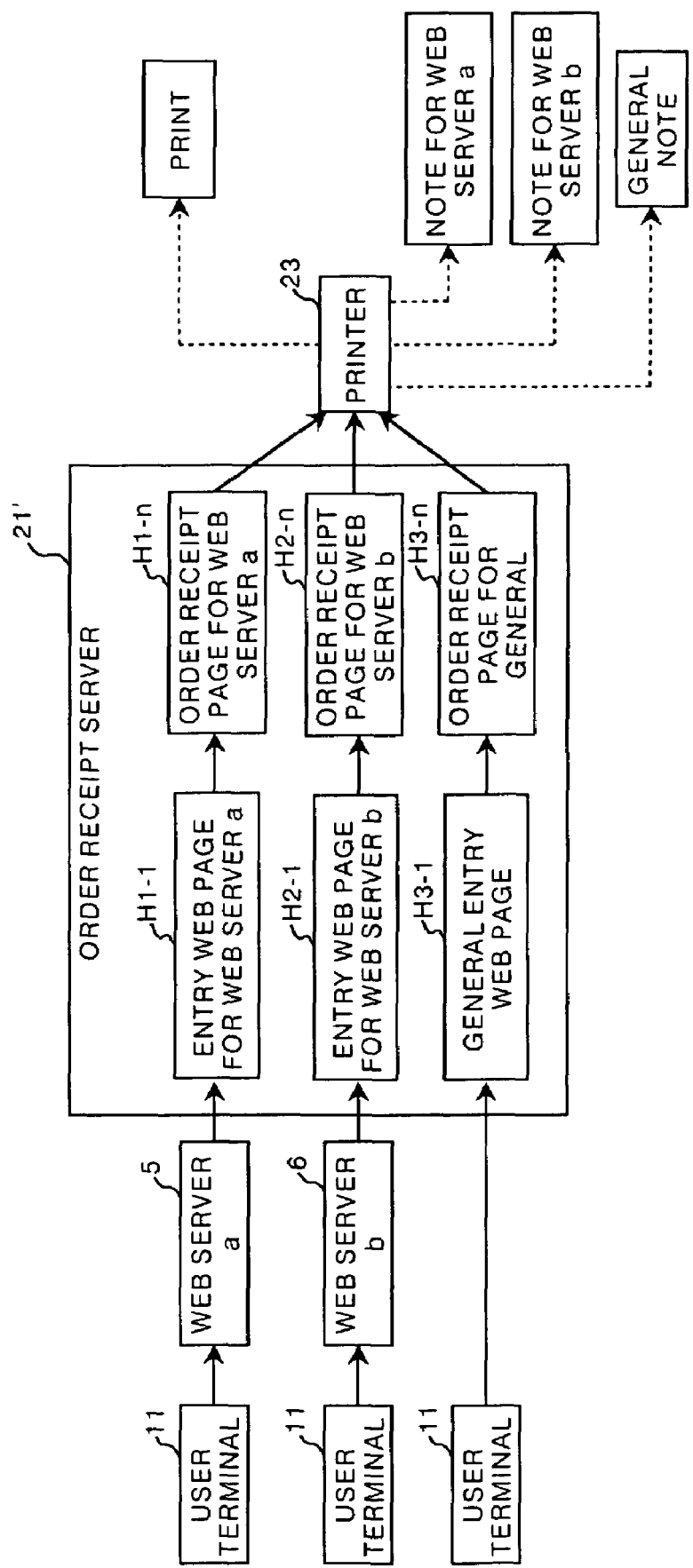
FIG. 7 is a view showing a processing flow with transition of connection of the nodes in the second embodiment.

FIG. 7 shows a processing flow with transition of connection of the nodes in the network photo-service system of the second embodiment.

In this embodiment, an entry web page H1-1 for the web site a is linked to an order receipt web page H1-n exclusively for the brand of the web site a. Similarly, an entry web page H2-1 for the web site b is linked to an order receipt web page H2-n exclusively for the brand of the web site b, and a general entry web page H3-1 is linked to a general order receipt web page H3-n.

In addition to the effect obtained in the first embodiment, the order receipt web pages can be more peculiar, for instance, in design of the order receipt web page to the respective brands since an order receipt web page is prepared for each brand.

What is claimed is:

1. A program stored in a computer readable medium for causing an order receipt server connected to a user terminal by way of a network to execute processing of receiving orders for prints of image data from the user terminal, the program comprising processing of
    obtaining a brand ID corresponding to an entry web page specified by the user, from among a plurality of entry web pages each corresponding to one of a plurality of brands;
    obtaining print service data corresponding to the brand ID from a predetermined database;
    displaying the entry web page specified by the user, based on the print service data; and
    receiving a print order under the brand corresponding to the entry web pages, based on the print service data.

2. A program stored in a computer readable medium as defined in claim 1, wherein each of the plurality of brands represents a service provider that offers a printing service.

3. A program stored in a computer readable medium as defined in claim 2, wherein the service provider is a photo processing shop.

4. A program stored in a computer readable medium as defined in claim 2, wherein the service provider is a mail order photo processing shop.

5. The program stored in the computer readable medium as defined in claim 1, wherein the entry web page designated by the user out of the plurality of entry web pages is accessed through an order receipt web page, which displays links to the plurality of entry web pages.

6. The program stored in the computer readable medium as defined in claim 1, wherein each of the plurality of entry web pages corresponds to a web page in a web server for one of the plurality of brands.

7. The program stored in the computer readable medium as defined in claim 1, wherein the entry web page designated by the user out of the plurality of entry web pages is accessed through a web page in a web server for a brand corresponding to the entry web page designated by the user.

8. The program stored in the computer readable medium as defined in claim 1, wherein when the entry web page is displayed, the order receipt server obtains a brand identification (ID) attached to the entry web page and obtains print service information corresponding to the brand ID from a database.

9. The program stored in the computer readable medium as defined in claim 8, wherein when the entry web page representing the brand designated by the user is displayed, the print service information corresponding to the brand is displayed.

10. The program stored in the computer readable medium as defined in claim 1, wherein upon the designation of the entry web page representing the service provider by the user, the print service information corresponding to the service provider is displayed.

11. The program stored in the computer readable medium as defined in claim 8, wherein when the entry web page is displayed, brand logo corresponding to the brand ID is displayed.

12. The program stored in the computer readable medium as defined in claim 8, wherein the print service information includes at least one of brand logo, prices of print and postcard templates.

* * * * *